US008511541B2

(12) United States Patent
Akamatsu

(10) Patent No.: US 8,511,541 B2
(45) Date of Patent: Aug. 20, 2013

(54) MONEY HANDLING SYSTEM

(75) Inventor: Toru Akamatsu, Oamishirasato-Machi (JP)

(73) Assignee: Glory Ltd., Himeji-Shi, Hyogo-Ken (JP)

( * ) Notice: Subject to any disclaimer, the term of this patent is extended or adjusted under 35 U.S.C. 154(b) by 263 days.

(21) Appl. No.: 12/736,131

(22) PCT Filed: Mar. 10, 2008

(86) PCT No.: PCT/JP2008/054303
§ 371 (c)(1),
(2), (4) Date: Sep. 13, 2010

(87) PCT Pub. No.: WO2009/113152
PCT Pub. Date: Sep. 17, 2009

(65) Prior Publication Data

US 2011/0015777 A1 Jan. 20, 2011

(51) Int. Cl.
*G06Q 40/00* (2012.01)

(52) U.S. Cl.
USPC .......... 235/379

(58) Field of Classification Search
USPC .......... 235/379; 902/14, 15; 382/135, 382/136
See application file for complete search history.

(56) References Cited

U.S. PATENT DOCUMENTS

| | | | | |
|---|---|---|---|---|
| 4,940,162 | A | 7/1990 | Thie | 221/129 |
| 5,012,932 | A * | 5/1991 | Omura et al. | 209/534 |
| 6,996,263 | B2 * | 2/2006 | Jones et al. | 382/135 |
| 7,212,948 | B2 * | 5/2007 | Voser | 702/182 |
| 2004/0026499 | A1 * | 2/2004 | Fujioka | 235/379 |
| 2004/0064413 | A1 | 4/2004 | M ätzig et al. | 705/42 |

FOREIGN PATENT DOCUMENTS

| | | |
|---|---|---|
| EP | 1 376 488 | 2/2004 |
| JP | 2001-67526 | 3/2001 |
| JP | 2002-042200 | 2/2002 |
| JP | 2002-334367 | 11/2002 |
| JP | 2006-155326 | 6/2006 |
| JP | 2007-65776 | 3/2007 |
| JP | 2007-286744 | 11/2007 |
| JP | 4050947 | 2/2008 |

OTHER PUBLICATIONS

International Preliminary Report (6 pages—dated Oct. 12, 2010).
European Search Report (7 pages—dated Feb. 28, 2011).

* cited by examiner

*Primary Examiner* — Ahshik Kim
(74) *Attorney, Agent, or Firm* — Renner, Kenner, Greive, Bobak, Taylor & Weber

(57) ABSTRACT

In order to improve a handling efficiency of a deposit operation and a dispense operation as a whole, a money handling system of the present invention includes: a reception unit configured to receive moneys; a recognition unit configured to recognize denominations of the moneys and to count the number of the moneys for each denomination; a storing and feeding unit configured to store and feed the moneys; a dispense unit configured to dispense the moneys such that the moneys can be taken out from outside; a transport unit configured to transport the moneys to the storing and feeding unit or the dispense unit; a storage unit configured to store change information showing the number of the change funds for each denomination; and a control unit configured to control the transport unit such that, based on the change information stored in the storage unit and a recognition result of the recognition unit, the transport unit transports the moneys received by the reception unit to the storing and feeding unit or the dispense unit, and that the transport unit transports the moneys fed by the storing and feeding unit to the dispense unit.

1 Claim, 7 Drawing Sheets

112

| | DENOMINATION | SUM | NUMBER |
|---|---|---|---|
| BANKNOTE | 1000 | ¥20000 | 20 |
| | 5000 | ¥50000 | 10 |
| COIN | 1 | ¥20 | 20 |
| | 5 | ¥50 | 10 |
| | 10 | ¥200 | 20 |
| | 50 | ¥500 | 10 |
| | 100 | ¥2000 | 20 |
| | 500 | ¥5000 | 10 |

112A (BANKNOTE rows); 112B (COIN rows)

FIG. 6
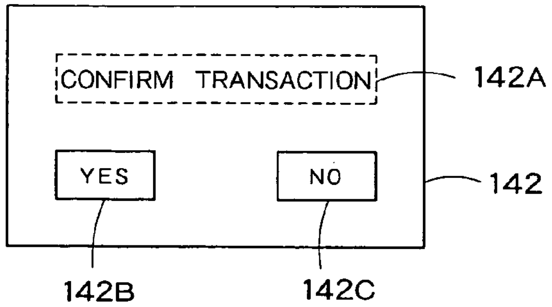
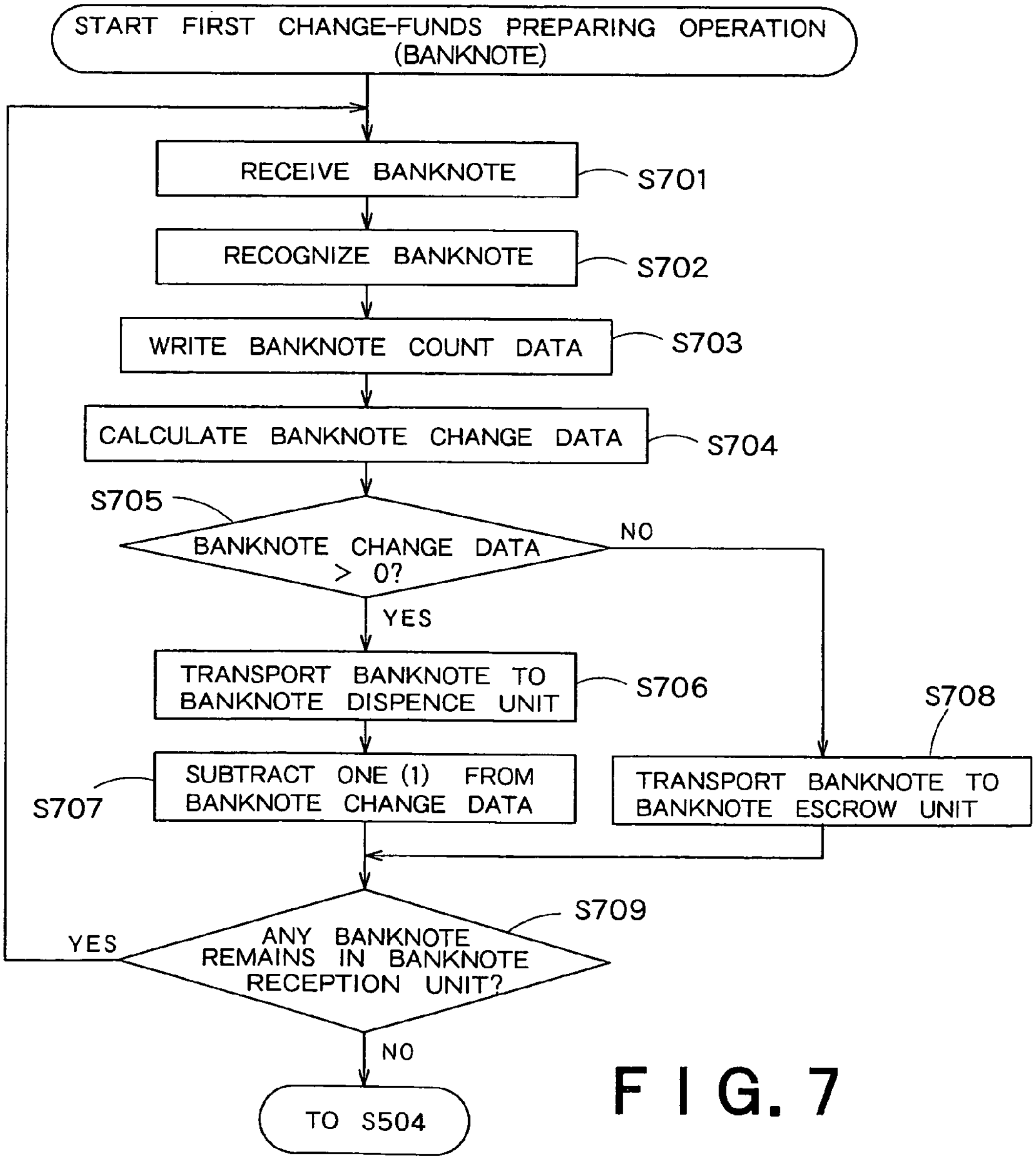
FIG. 7

212

| | DENOMINATION | SUM | NUMBER | |
|---|---|---|---|---|
| BANKNOTE | 1000 | ¥20000 | 20 | 212A |
| | 5000 | ¥50000 | 10 | |
| COINROLL | 1 | ¥50 | 1 | 212B |
| | 5 | ¥250 | 1 | |
| | 10 | ¥500 | 1 | |
| | 50 | ¥2500 | 1 | |
| | 100 | ¥5000 | 1 | |
| | 500 | ¥25000 | 1 | |

MONEY HANDLING SYSTEM

FIELD OF THE INVENTION

The present invention relates to a money handling system. In particular, the present invention relates to a money handling system installed in the back office of a store, for counting sales proceeds and for preparing change funds.

BACKGROUND ART

Installed in the back office of a store is a deposit machine that performs a deposit operation in which sales proceeds of the day is counted, and a dispense machine that prepares change funds for the following day. The dispense operation is performed, after the deposit operation have been finished (i.e., after sales proceeds for the business day have been confirmed).

However, in a conventional money handling system, since the dispense operation is performed after the deposit operation has been performed, the longer the deposit operation takes, the longer the waiting time becomes before the start of the dispense operation. As a result, a handling efficiency of the money handling system is decreased and operation time from a start of the deposit operation to a finish of the dispense operation becomes longer. In particular, in recent large stores that have long business hours (e.g., supermarkets), since the number of deposit operations and the number of dispense operations are large but an operation time at the back office is limited, the dispense operations are sometimes performed immediately before the open of the store on the following day.

In the deposit operation, in order to count sales proceeds, denominations of moneys are recognized, and the number of the moneys is counted for each denomination. On the other hand, in the dispense operation, the number of stored moneys is counted in order to dispense the moneys. Namely, when the deposit operation and the dispense operation are separately performed, the counting operations are performed twice, which is inefficient (JP2001-067526A, JP2006-155326A, and JP2007-65776A).

SUMMARY OF THE INVENTION

The present invention has been made in view of these circumstances. According to the present invention, a handling efficiency of the money handling system can be improved, whereby a time from a start of the deposit operation to a finish of the dispense operation can be reduced.

According to a first aspect of the present invention, there is provided a money handling system that performs a deposit operation for counting moneys and a dispense operation for preparing change funds, the money handling system including: a reception unit configured to receive the moneys; a recognition unit configured to recognize denominations of the moneys and to count the number of the moneys for each denomination; a storing and feeding unit configured to store and feed the moneys; a dispense unit configured to dispense the moneys such that the moneys can be taken out from outside; a transport unit configured to transport the moneys to the storing and feeding unit or the dispense unit; a storage unit configured to store change information showing the number of the change funds for each denomination; and a control unit configured to control the transport unit such that, based on the change information stored in the storage unit and a recognition result of the recognition unit, the transport unit transports the moneys received by the reception unit to the storing and feeding unit or the dispense unit, and that the transport unit transports the moneys fed by the storing and feeding unit to the dispense unit.

In the present invention, it is preferable that the control unit is configured to control the storing and feeding unit such that the storing and feeding unit feeds moneys whose number corresponds to a difference between the number of the change funds shown in the change information and the number of the moneys transported to the dispense unit, and to control the transport unit such that the transport unit transports the moneys fed by the storing and feeding unit to the dispense unit.

In the present invention, it is preferable that the storing and feeding unit has an escrow unit configured to escrow the moneys transported by the transport unit, and the storing and feeding unit is configured to store and feed the moneys escrowed in the escrow unit; and the control unit is configured to control the storing and feeding unit such that moneys are fed out of the escrowed moneys, the number of the fed moneys corresponding to a difference between the number of the change funds shown in the change information and the number of the moneys transported to the dispense unit.

In the present invention, it is preferable that the money handling system further includes an instruction reception unit configured to receive a deposit accepting instruction that approves a deposit sum or a deposit canceling instruction that does not approve a deposit sum, after all the moneys received in the reception unit have been transported to the dispense unit or the storing and feeding unit, wherein the control unit is configured to control the storing and feeding unit such that, when the deposit accepting instruction is received by the instruction reception unit, the storing and feeding unit feeds the escrowed moneys escrowed in the escrow unit.

In the present invention, it is preferable that the money handling system further includes a display unit configured to display a character or an image, wherein the control unit is configured to control the display unit such that the display unit displays a character or an image for prompting an input of the instruction, after all the money placed in the reception unit have been transported to the dispense unit or the storing and feeding unit.

In the present invention it is preferable that the instruction reception unit is configured to receive an instruction on the change information, and the control unit is configured to write the change information received by the instruction reception unit to the storage unit.

In the present invention, it is preferable that, when the deposit canceling instruction is received by the instruction reception unit, the control unit is configured to control the storing and feeding unit and the transport unit such that the storing and feeding unit feeds all the moneys escrowed in the escrow unit, and that the transport unit transports the moneys to the dispense unit.

In the present invention, it is preferable that the control unit is configured to control the storing and feeding unit such that the storing and feeding unit feeds a money out of the moneys escrowed in the escrow unit, the denomination of the fed money being the same as that of the money transported to the dispense unit immediately before.

In the present invention it is preferable that the dispense unit has a shutter, and that the control unit is configured to control the dispense unit such that the shutter is opened, when the moneys whose number correspond to those of the change funds shown in the change information are transported to the dispense unit.

According to a second aspect of the present invention, there is provided a money handling system including: a coin handling machine configured to perform a coin deposit operation for counting loose coins so as to accept a count result as a deposit sum; a banknote handling machine configured to perform a banknote deposit operation for counting banknotes so as to accept a count result as a deposit sum, and a banknote dispense operation for preparing change funds of banknotes; a coin-roll handling machine configured to store a coin roll, and to perform a coin dispense operation for preparing change funds with the use of the stored coin roll; a control unit configured to control the coin handling machine, the banknote handling machine, and the coin-roll handling machine; and a storage unit configured to store change information showing the number of the change funds for each denomination; wherein the coin handling machine has: a coin reception unit configured to receive the coins; a coin recognition unit configured to recognize denominations of the coins and to count the number of the coins for each denomination; a coin storing unit configured to store the coins; and a coin transport unit configured to transport the coins to the coin storing unit; wherein the banknote handling machine has: a banknote reception unit configured to receive the banknotes; a banknote recognition unit configured to recognize denominations of the banknotes and to count the number of the banknotes for each denomination; a banknote storing and feeding unit configured to store and feed the banknotes; a banknote dispense unit configured to dispense the banknotes such that the banknotes can be taken out from outside; and a banknote transport unit configured to transport the banknotes to the banknote storing and feeding unit or the banknote dispense unit; wherein the coin-roll handling unit has: a coin-roll storing and feeding unit configured to store and feed the coin roll; and a coin-roll dispense unit configured to dispense the coin roll such that the coin roll can be taken out from outside; and wherein: the control unit is configured to cause the coin handling machine to perform the coin deposit operation, and to cause the banknote handling machine to perform the banknote deposit operation, the control unit is configured to cause the banknote handling machine to perform the banknote dispense operation for transporting the banknotes received by the banknote reception unit to the banknote dispense unit based on the change information during the banknote deposit operation, and transporting banknotes corresponding to a shortage in change funds from the banknote storing and feeding unit to the banknote dispense unit; and the control unit is configured to cause the coin-roll handling machine to perform the coin-roll dispense operation for dispensing a coin roll from the coin-roll storing and feeding unit to the coin-roll dispense unit, based on the change information.

BRIEF DESCRIPTION OF THE DRAWINGS

FIG. 6 is a schematic view showing an example of a confirmation message image;

FIG. 7 is a flowchart showing a procedure of a first change-funds preparing operation of banknotes (S503 of FIG. 5) in the embodiment 1 of the present invention;

BEST MODE FOR CARRYING OUT THE INVENTION

Hereinafter embodiments of the present invention will be described with reference to the drawings. The following embodiments are mere examples of the present invention, and will not limit the scope of the present invention.

Embodiment 1

An embodiment 1 of the present invention is firstly described. The embodiment 1 of the present invention is an example of a money handling system that simultaneously performs a deposit operation and a dispense operation.

Figure 1:
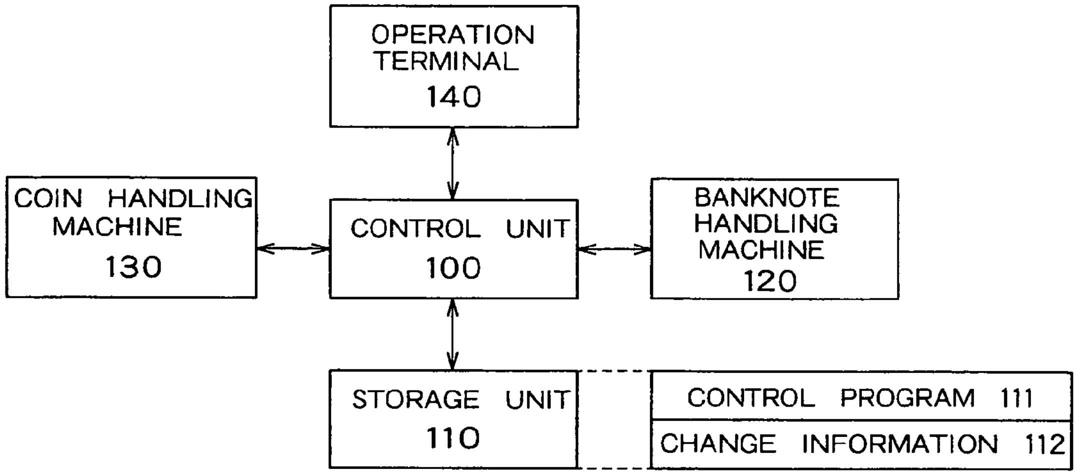
FIG. 1 is a block diagram showing the structure of a money handling system in an embodiment 1 of the present invention.

FIG. 1 is a block diagram showing the structure of the money handling system in the embodiment 1 of the present invention.

The money handling system in the embodiment 1 of the present invention includes a control unit 100, a storage unit 110, a banknote handling machine 120, a coin handling machine 130, and an operation terminal 140, wherein the banknote handling machine 120 and the coin handling machine 130 constitute a money handling machine in the embodiment 1 of the present invention.

The embodiment 1 of the present invention includes the banknote handling machine 120 and the coin handling machine 130 as the money handling machine. However, the banknote handling machine 120 and the coin handling machine 130 have the same structure, so that the concrete structure of only the banknote handling machine 120 is described by way of example, and the concrete structure of the coin handling machine 130 is omitted. Alternatively, the embodiment 1 of the present invention may be a money handling system including only one of the banknote handling machine 120 and the coin handling machine 130.

The control unit 100 is connected to the storage unit 110, the banknote handling machine 120, the coin handling machine 130, and the operation terminal 140. Based on a control program 111 stored in the storage unit 110, the control unit 100 controls the banknote handling machine 120, the coin handling machine 130, and the operation terminal 140.

The storage unit 110 stores the control program 111 and change information 112. The storage unit 110 also functions as a working memory of the control unit 100. The control program 111 is a program for controlling the money handling system, and the change information 112 is information showing the number of moneys for change funds for each denomination. The denominations of moneys for change funds and the numbers thereof may differ from register to register in a store, or may be common to all the resisters.

The banknote handling machine 120 counts banknotes, so as to perform a banknote deposit operation, and a banknote dispense operation for preparing change funds. The coin handling machine 130 counts loose coins, so as to perform a coin deposit operation and a coin dispense operation for preparing change funds.

Figure 2:
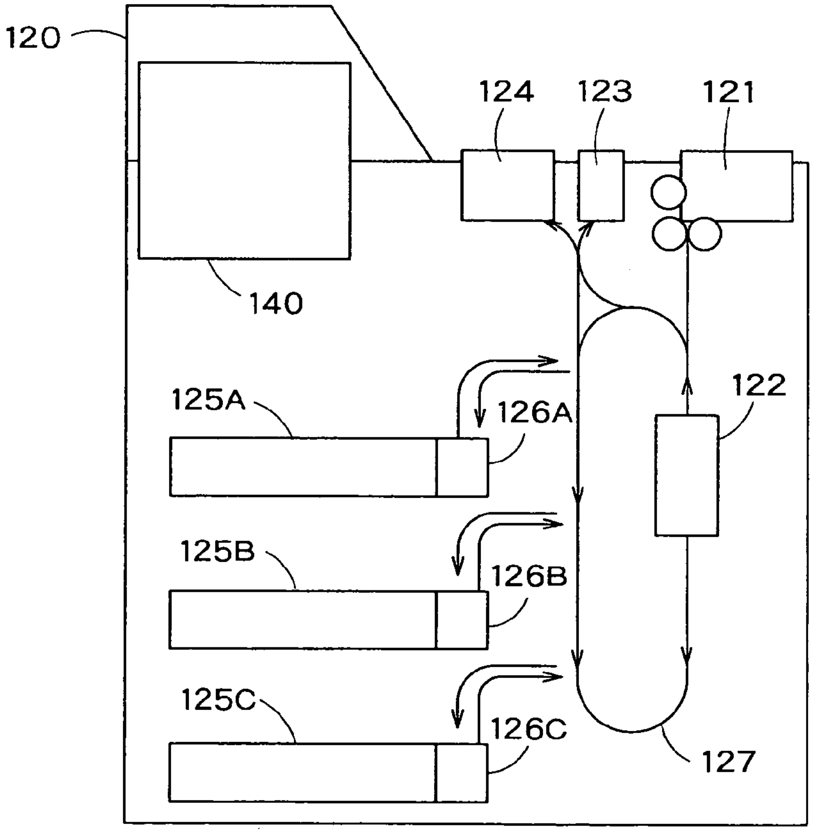
FIG. 2 is a block diagram showing the structure of a banknote handling machine 120 of FIG. 1.

FIG. 2 is a block diagram showing the structure of the banknote handling machine 120 of FIG. 1.

The banknote handling machine 120 includes a banknote reception unit 121, a banknote recognition unit 122, a banknote reject unit 123, a banknote dispense unit 124, banknote storing and feeding units 125A to 125C, banknote escrow units 126A to 126C, and a banknote transport unit 127.

The banknote reception unit 122 feeds banknotes placed therein, so that the banknotes are received one by one into the banknote handling machine 120.

The banknote recognition unit 122 recognizes denominations of the banknotes received by the banknote reception unit 121, and counts the number of the banknotes for each denomination.

The banknote reject unit 123 collects the banknotes whose denominations could not be recognized (hereinafter referred to as "reject banknotes") by the banknote recognition unit 122.

The banknote dispense unit 124 dispenses banknotes for change (hereinafter referred to as "banknotes for change funds") such that the banknotes for change funds can be taken out from outside of the banknote handling machine 120. The banknote dispense unit 124 has a shutter, not shown. When the transaction is confirmed, the banknote dispense unit 124 unlocks the shutter to open, whereby the banknotes can be taken out from outside.

Each of the banknote storing and feeding units 125A to 125C has a storing mechanism for storing banknotes, and a feeding mechanism for feeding the stored banknotes.

The banknote escrow units 126A to 126C are structured as parts of the banknote storing and feeding units 125A to 125C, respectively. Each of the banknote escrow units 126A to 126C escrows banknotes transported thereto by the banknote transport unit 127, separately from the stored banknotes. When a deposit sum is approved and a deposit accepting instruction is received by the operation terminal 140, the banknote escrow units 126A to 126C release the escrow condition. When the escrow condition is released, the escrowed banknotes are stored by the banknote storing and feeding units 125A to 125C. On the other hand, when a deposit sum is not approved and a deposit canceling instruction is received by the operation terminal 140, the escrowed banknotes are fed by the feeding mechanisms.

The banknote transport unit 127 transports the banknotes received by the banknote reception unit 121 to the banknote recognition unit 122. Based on the recognition result of the banknote recognition unit 122, the banknote transport unit 127 transports the banknotes to the banknote reject unit 123, the banknote dispense unit 124, the banknote storing and feeding units 125A to 125C, or the banknote escrow units 126A to 126C. The banknote transport unit 127 also transports the banknotes fed by the banknote storing and feeding units 125A to 125C to the banknote dispense unit 124.

In the embodiment 1 of the present invention, the number of the banknote storing and feeding units 125A to 125C and the number of the banknote escrow units 126A to 126C are not limited to three.

Figures 3, 4:
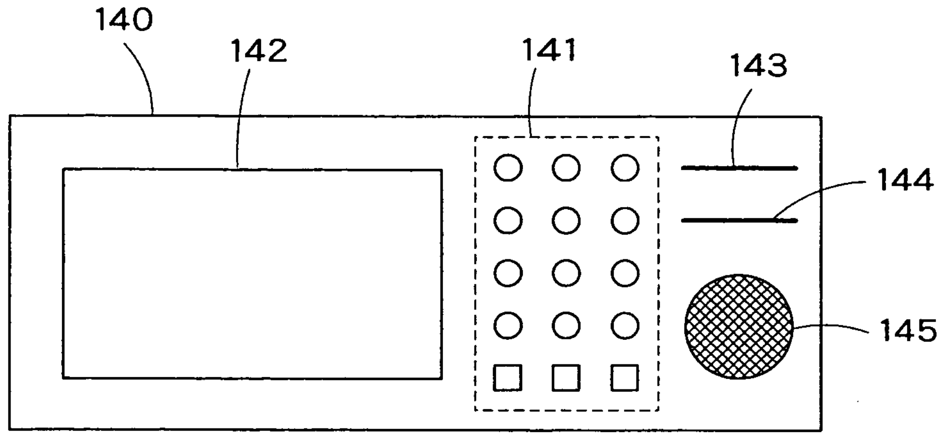
FIG. 3 is a plan view showing the appearance of an operation terminal 140 of FIG. 1.
FIG. 4 is a schematic view showing the data structure of change information 112 in the embodiment 1 of the present invention.

FIG. 3 is a plan view showing the appearance of the operation terminal 140 of FIG. 1.

The operation terminal 140 includes an instruction reception unit 141, a display unit 142, an ID information reading unit 143, a printing unit 144, and an alerting unit 145.

For example, the instruction reception unit 141 is formed of a plurality of keys for receiving an instruction of an operator. The display unit 142 is formed of a liquid crystal display panel for displaying predetermined information. The ID information reading unit 143 is formed of a card reader. The printing unit 144 is formed of a printer. The alerting unit 145 is formed of a speaker for outputting sound or a lamp for outputting light.

In the embodiment 1 of the present invention, the instruction reception unit 141 may receive an input of ID information of the operator. In this case, the instruction reception unit 141 also serves as the ID information reading unit 143.

FIG. 4 is a schematic view showing the data structure of the change information 112 in the embodiment 1 of the present invention.

The change information 112 includes banknote change funds information 112A, which shows the sum and the number of the banknotes for change funds for each denomination, and coin change funds information 112B, which shows the sum and the number of the coins for change funds for each denomination. The change information 112 is set based on an instruction of an operator, which has been received by instruction reception unit 141, or based on previously registered information, and is stored in the storage unit 110.

Figure 5:
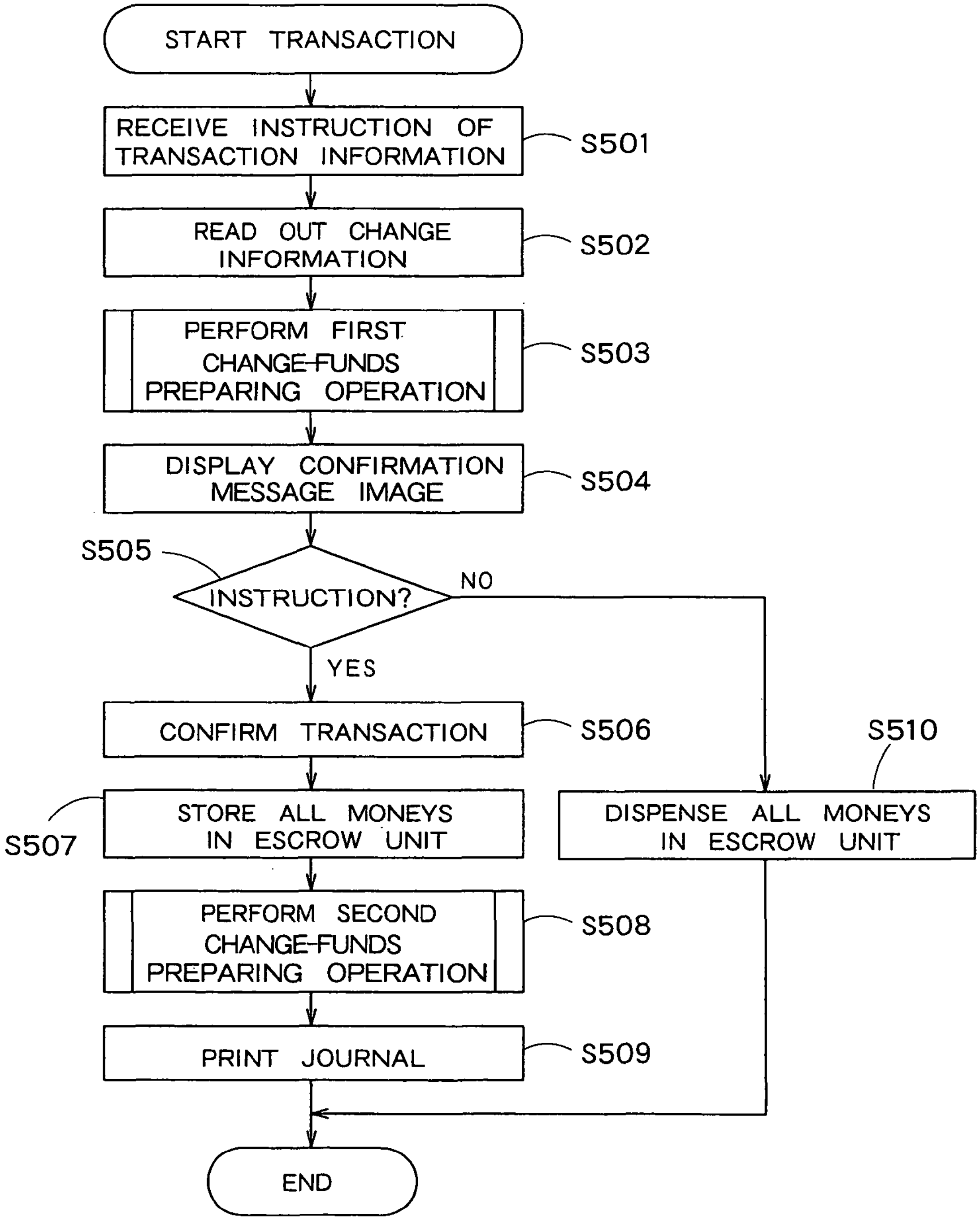
FIG. 5 is a flowchart showing a procedure of a transaction in the embodiment 1 of the present invention.

FIG. 5 is a flowchart showing the procedure of a transaction in the embodiment 1 of the present invention. The transaction in the embodiment 1 of the present invention is performed on the assumption that the change information 112 has been stored in the storage unit 110.

At first, a transaction information instruction of an operator is received by the instruction reception unit 141 (S501). The transaction information includes a register ID, an amount of sales proceeds, the number of the banknotes remained in the register for each denomination, and the number of the coins remained in the register for each denomination.

Then, the change information 112 stored in the storage unit 110 is read out (S502).

Then, a first change-funds preparing operation, which will be described below, is performed (S503). In the first change-funds preparing operation, a deposit operation for counting sales proceeds and a dispense operation for preparing change funds are simultaneously performed.

Then, a confirmation message screen as shown in FIG. 6 is displayed on the display unit 142 (S504). The confirmation message screen includes a message 142A, a YES button 142B, and a NO button 124C. The message 142A may be expressed by characters or drawings. When the YES button 142B is selected, the operation terminal 140 receives a deposit accepting instruction. Meanwhile, when the NO button 142C is selected, the operation terminal 142 receives a deposit canceling instruction.

In the step S504, when the displayed YES button 142B is selected (S505-YES), the transaction is accepted (S506). At this time, the transaction information received in the step S501 and the result of the first change-funds preparing operation performed in the step S503 are written in the storage unit 110.

Then, all the banknotes escrowed in the banknote escrow units 126A to 126C are stored by the banknote storing and feeding units 125A to 125C (S507).

Then, a second change-funds preparing operation, which will be described below, is performed (S508). The second change-funds preparing operation is a dispense operation for complementing the shortage in the change funds that occurred in the first change-funds preparing operation, after the first change-funds preparing operation has been performed in the step S503.

Then, the printing unit 144 prints out a journal (S509) including: information about the transaction accepted in the step S506; the result of the first change-funds preparing operation performed in the step S503; and the result of the second change-funds preparing operation performed in the step S508. At this time, the shutter of the banknote dispense unit 124 is opened.

On the other hand, when the NO button 142C displayed in the step S504 is selected (S505-NO), all the banknotes escrowed in the banknote escrow units 126A to 126C are fed to the banknote transport unit 127 by the banknote storing and feeding units 125A to 125C. Then, the banknotes are transported by the banknote transport unit 127 to the banknote dispense unit 124, and are dispensed from the banknote dispense unit 124 to the outside of the banknote handling machine 120 (S510).

The transaction in the embodiment 1 of the present invention is finished after the steps S509 and S510.

FIG. 7 is a flowchart showing a procedure of the first change-funds preparing operation of banknotes (S503 of FIG. 5) in the embodiment 1 of the present invention.

At first, banknotes placed in the banknote reception unit 121 are received into the banknote handling machine 120 (S701).

Then, the banknote recognition unit 122 recognizes denominations of the banknotes received in the step S701, and counts the number of the banknotes for each denomination (S702).

Then, banknote count data showing the count result by the banknote recognition unit 122 in the step S702 are written in the storage unit 110 (S703). At this time, if other banknote count data has been already stored in the storage unit 110, the other banknote count data is updated.

Then, based on the transaction information received in the step S501 of FIG. 5 and the change information 112 read out in the step S502 of FIG. 5, banknote change data are calculated (S704). The banknote change data show the numbers of the shortages of the banknotes for change funds, which are difference between the numbers of the banknotes for change funds for the respective denominations, shown in the change information 112, and the numbers of the banknotes remained in the corresponding register for the respective denominations, shown in the transaction information.

Then, when the value of the banknote change data calculated in the step S704 is a positive value (i.e., banknotes for change funds are insufficient) (5705-YES), the banknote recognized in the step S702 is transported by the banknote transport unit 127 to the banknote dispense unit 124 (S706).

Then, the value of the banknote change data is subtracted by one (−1) (S707).

On the other hand, when the value of the banknote change data calculated in the step S704 is not more than zero (i.e., banknotes for change funds are sufficient) (S705-NO), the banknote recognized in the step S702 is transported by the banknote transport unit 127 to the banknote escrow units 126A to 126C (S708).

The steps S701 to S708 are repeated as long as the banknotes remain in the banknote reception unit 121 (5709-YES). When there remains no banknote in the banknote reception unit 121, the first change-funds preparing operation of the banknote handling machine 120 is finished (S709-NO).

Figure 8:
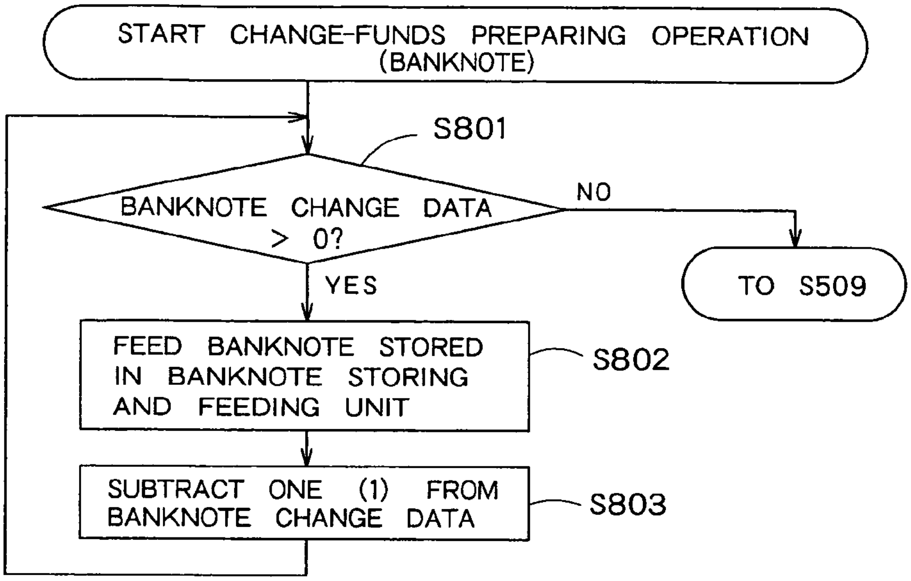
FIG. 8 is a flowchart showing a procedure of a second change-funds preparing operation of banknotes (S508 in FIG. 5) in the embodiment 1 of the present invention.

FIG. 8 is a flowchart showing a procedure of the second change-funds preparing operation of banknotes (S508 of FIG. 5) in the embodiment 1 of the present invention.

At first, when the value of the banknote change data shows a positive value (i.e., banknotes for change funds are insufficient) (5801-YES), the required number of banknotes of which there is shortage are fed from the banknote storing and feeding units 125A to 125C to the banknote transport unit 127, and are transported by the banknote transport unit 127 to the banknote dispense unit 124 (S802).

Then, the value of the banknote change data is subtracted by one (−1) (S803).

On the other hand, when the value of the banknote change data is not more than zero (i.e., banknotes for change funds are sufficient) (5801-NO), the second change-funds preparing operation of the banknote handling machine 120 is finished.

According to the embodiment 1 of the present invention, since the deposit operation for counting sales proceeds and the dispense operation for preparing change funds are simultaneously performed in one transaction, a handling efficiency of the money handling system can be improved, whereby a time from a start of the deposit operation to a finish of the dispense operation can be reduced.

Embodiment 2

Next, an embodiment 2 of the present invention is described. In the embodiment 2, a coin deposit operation is performed by a coin handling machine, and a coin dispense operation is performed by a coin-roll handling machine. In the embodiment 2, the coin handling machine does not perform the dispense operation. Thus, in the coin deposit operation, it is not necessary to classify coins by denomination, and the coins of mixed denominations are collectively handled.

Figure 9:
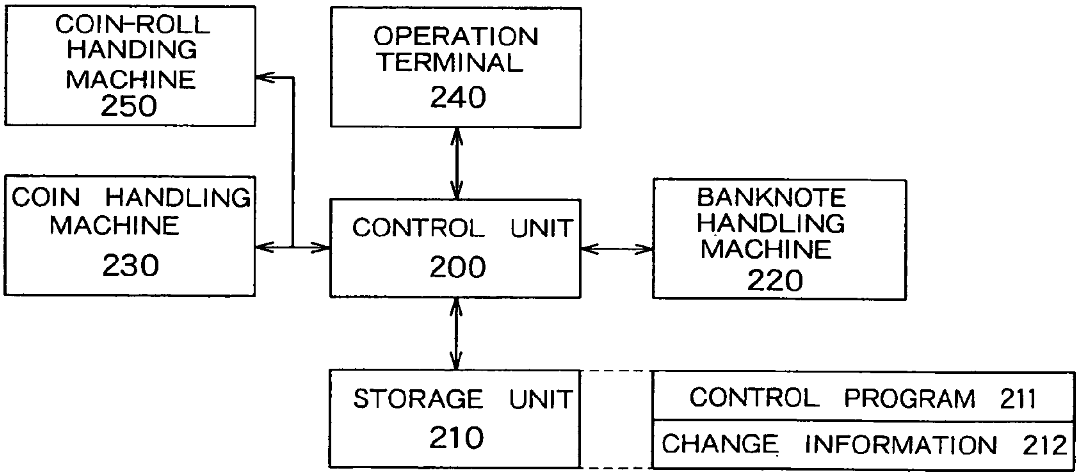
FIG. 9 is a block diagram showing the structure of a money handling system in an embodiment 2 of the present invention.

FIG. 9 is a block diagram showing the structure of a money handling system in the embodiment 2 of the present invention.

A money handling system in the embodiment 2 of the present invention includes a control unit 200, a storage unit 210, a banknote handling machine 220, a coin handling machine 230, an operation terminal 240, and a coin-roll handling machine 250.

The control unit 200 is connected to the storage unit 210, the banknote handling unit 220, the coin handling unit 230, the operation terminal 240, and the coin-roll handling machine 250. Based on a control program 211 stored in the storage unit 210, the control unit 200 controls the banknote handling machine 220, the coin handling machine 230, the operation terminal 240, and the coin-roll handling machine 250.

The storage unit 210 stores the control program 211 and change information 212. The storage unit 210 also functions as a working memory of the control unit 200. The control program 211 is a program for controlling the money handling system, and the change information 212 is information showing the number of moneys for change funds for each denomination. The denominations of moneys for change funds and the numbers thereof may differ from register to register in a store, or may be common to all the resisters.

The banknote handling machine 220 counts banknotes, so as to perform a banknote deposit operation, and a banknote dispense operation for preparing change funds. The banknote handling machine 220 has units 221 to 227 of the same structure as the units 121 to 127 of the banknote handling machine 120 in the embodiment 1 of the present invention. The coin handling machine 230 counts loose coins, and performs a coin deposit operation. The coin-roll handling machine 250 stores coin rolls, and performs a coin dispense operation for preparing change funds with the use of the stored coin rolls.

Figure 10:
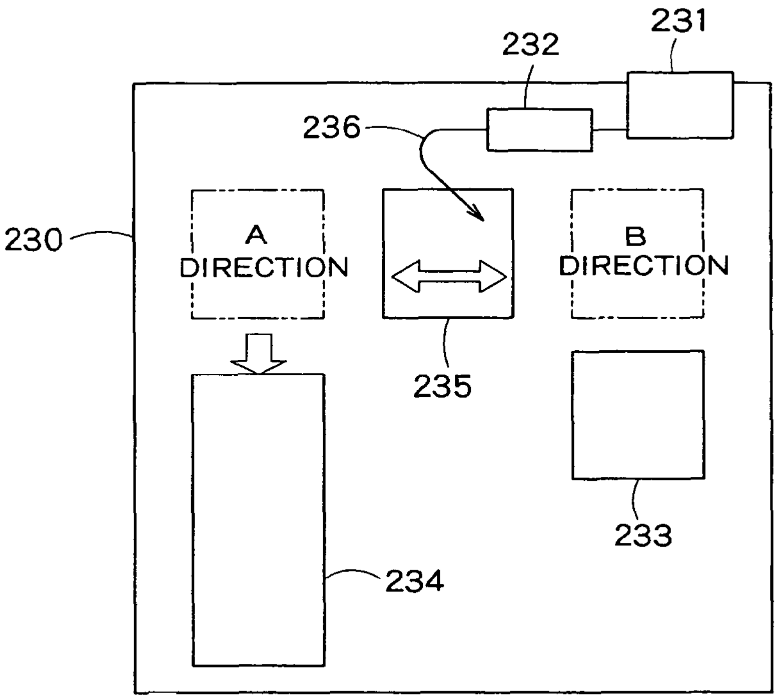
FIG. 10 is a block diagram showing the structure of a coin handling machine 230 of FIG. 9.

FIG. 10 is a block diagram showing the structure of the coin handling machine 230 of FIG. 9.

The coin handling machine 230 includes a coin reception unit 231, a coin recognition unit 232, a coin return unit 233, a coin storing unit 234, a coin escrow unit 235, and a coin transport unit 236.

The coin reception unit 231 feeds coins put therein, so that the coins are received one by one into the coin handling machine 230. Then, the coin reception unit 231 feeds the coins to the coin recognition unit 232.

The coin recognition unit 232 recognizes denominations of the coins fed by the coin reception unit 231, and counts the number of the coins for each denomination.

The coin escrow unit 235 collectively escrows the coins transported thereto by the coin transport unit 236. When a deposit sum is approved and a deposit accepting instruction is received by the operation terminal 240, the coin escrow unit 235 is moved in the direction A in FIG. 10, so as to collectively send the coins escrowed therein to the coin storing unit 234. On the other hand, when a deposit canceling instruction is received by the operation terminal 240, the escrow unit 235 is moved in the direction B in FIG. 10, so as to return the coins escrowed therein to the coin return unit 233.

The coin return unit 233 returns coins to be returned (hereinafter referred to as "to-be-returned coins") such that the to-be-returned coins can be taken out from outside the coin handling machine 230. The coin return unit 233 has a shutter, not shown. When a deposit sum is not approved and a deposit canceling instruction is received by the operation terminal 240, the coin return unit 233 receives coins from the escrow unit 35. Then, the coin return unit 233 unlocks the shutter to open, whereby the coins can be taken out from outside.

When a deposit sum is approved and a deposit accepting instruction is received by the operation terminal 240, the coin storing unit 234 collectively receives the coins escrowed in the coin escrow unit 235.

The coin transport unit 236 transports the coins fed by the coin reception unit 231 to the coin recognition unit 232. Based on the recognition result by the coin recognition unit 232, the coin transport unit 236 transports the coins to the coin escrow unit 235.

Figure 11:
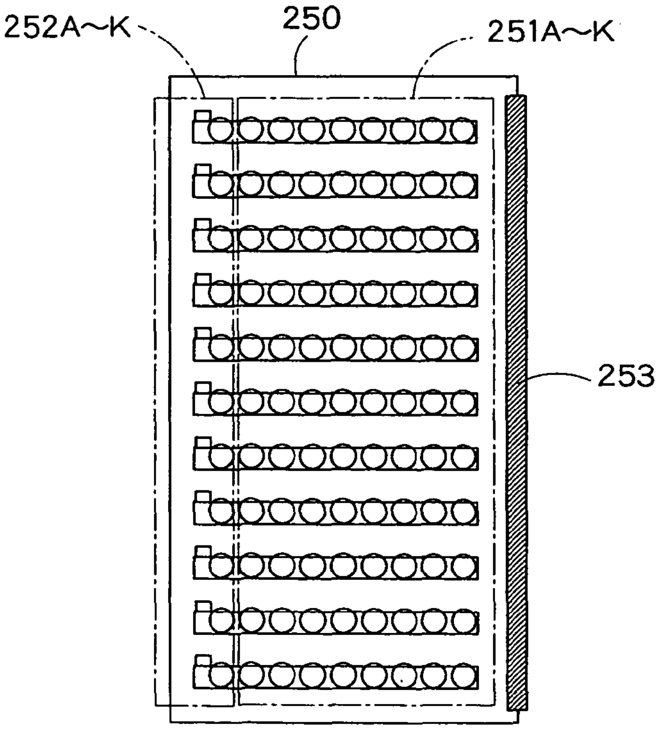
FIG. 11 is a schematic view showing the structure of a coin-roll handling machine 250 of FIG. 9.

FIG. 11 is a schematic view showing the structure of the coin-roll handling machine 250.

The coin-roll handling machine 250 includes coin-roll storing and feeding units 251A to 251K, coin-roll count units 252A to 252K, and a coin-roll dispense unit 253.

The coin-roll storing and feeding units 251A to 251K are of a tray-like shape, for storing therein coin rolls of each denomination in an aligned manner. Each of the coin-roll storing and feeding units 251A to 251K has a storing mechanism capable of dispensing the required number of coin rolls in accordance with a drawn amount of the tray.

The coin-roll count units 252A to 252K are disposed correspondingly to the coin-roll storing and feeding units 251A to 251K. The coin-roll count units 252A to 252K count the number of coin rolls to be dispensed, out of the coin rolls stored in the coin-roll storing and feeding units 251A to 251K.

The coin-roll dispense unit 253 dispenses a coin roll for change (hereinafter referred to as "coin roll for change funds") outside the coin-roll handling machine 250. The coin-roll dispense unit 253 has a shutter structure. After a deposit accepting instruction has been received by the operation terminal 240, and the number of required coin rolls has been counted, the coin-roll dispense unit 253 unlocks the shutter to open.

In the embodiment 2 of the present invention, the number of the coin-roll storing and feeding units 251A to 251K and the number of the coin-roll count units 252A to 252K are eleven, respectively, so as to allocate the plurality of units to coins of denominations which are highly demanded as coins for change funds. However, the present invention is not limited thereto.

Figures 12, 13:
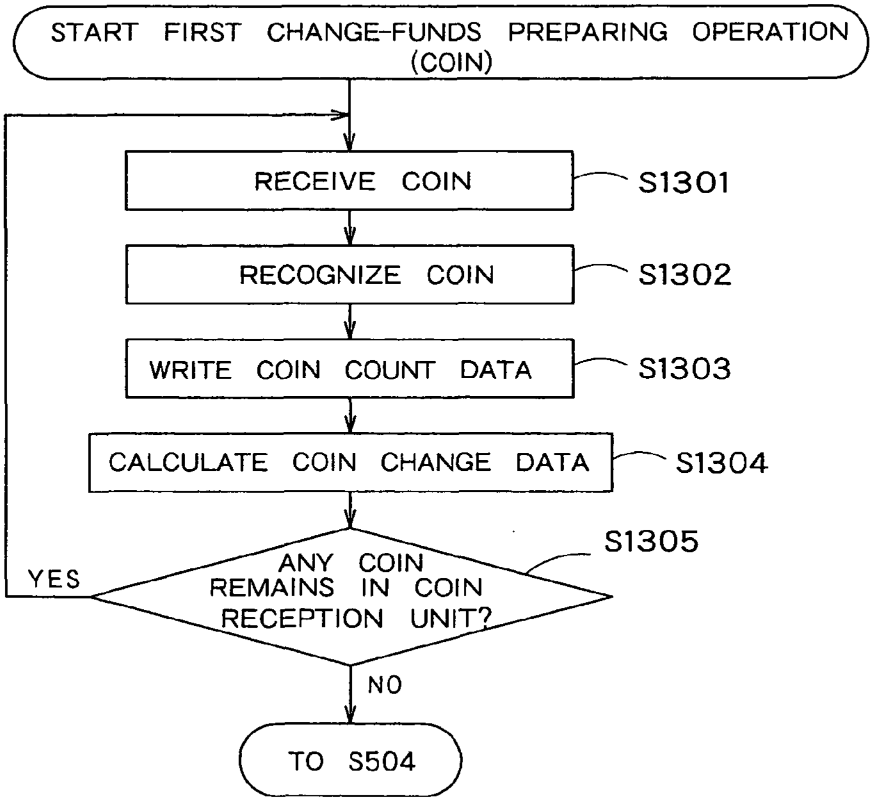
FIG. 12 is a schematic view showing the data structure of change information 212 in the embodiment 2 of the present invention.
FIG. 13 is a flowchart showing a procedure of a first change-funds preparing operation of coins (S503 in FIG. 5) in the embodiment 2 of the present invention.

FIG. 12 is a schematic view showing the data structure of the change information 212 in the embodiment 2 of the present invention.

The change information 212 includes banknote change funds information 212A, which shows the sum and the number of banknotes for change funds for each denomination, and coin-roll change funds information 212B, which shows the sum and the number of coin-rolls for change funds for each denomination. The change information 212 is set based on an instruction of an operator, which has been received by the instruction reception unit 241, or based on previously registered information, and is stored in the storage unit 210.

Next, the first change-funds preparing operation of coins in the embodiment 2 of the present invention is described. In the embodiment 2 of the present invention, the transaction operation is performed similarly to that of the embodiment 1 (FIG. 5) of the present invention, and the first change-funds preparing operation of banknotes (S503 of FIG. 5) is performed similarly to that of the embodiment 1 (FIG. 7) of the present invention. Meanwhile, the second change-funds preparing operation (S508 of FIG. 5) is performed only for banknotes.

FIG. 13 is a flowchart showing a procedure of the first change-funds preparing operation of coins (S503 of FIG. 5) in the embodiment 2 of the present invention.

At first, coins put in the coin reception unit 231 are received into the coin handling machine 230, and are fed to the coin recognition unit 232 (S1301).

Then, the coin recognition unit 232 recognizes denominations of the coins fed in the step S1301, and counts the number of the coins for each denomination (S1302).

Then, coin count data showing the count result of the coin recognition unit 232 in the step S1302 are written in the storage unit 210 (S1303). At this time, if other coin count data has been already stored in the storage unit 210, the other coin count data is updated.

Then, based on the transaction information received in the step S501 of FIG. 5 and the change information 212 read out in the step S502, coin change data are calculated (S1304). The coin change data show the numbers of the shortage in the coins for change funds, which are difference between the numbers of the coins for change funds for the respective denominations, shown in the change information 212, and the numbers of the remaining coins for the respective denominations, shown in the transaction information. In the embodiment 2 of the present invention, loose coins are used for deposit, while roll coins are dispensed as change funds. Thus, the number of coin rolls corresponding to the number of coins for change funds shown in the change funds information 212 is calculated as the coin change data.

The steps S1301 to 1304 are repeated as long as the coins remain in the coin reception unit 231 (S1305-YES). When there remains no coin in the coin reception unit 231, the first change-funds preparing operations of the coin handling machine 230 and the coin-roll handling machine 250 are finished (S1305-NO).

According to the embodiment 2 of the present invention, the money handling system includes the banknote handling machine 220 that simultaneously performs the banknote deposit operation and the banknote dispense operation, the coin handling machine 230 that performs the coin deposit operation, and the coin-roll handling machine 240 that performs the coin dispense operation. Thus, the banknote deposit operation for counting sales proceeds and the dispense operation for preparing banknotes for change funds can be simultaneously performed by the banknote handling machine 220, and the coin deposit operation for counting sales proceeds is performed by the coin handling machine 230. Furthermore, simultaneously with the coin deposit operation, the coin dispense operation for preparing coins for change funds is performed by the coin-roll handling machine 240. Thus, in addition to the same effect as that of the embodiment 1 of the present invention, the embodiment 2 provides an advantageous effect in that coins for change funds can be prepared in a rolled condition, which facilitates handling of coins.

The invention claimed is:

1. A money handling system comprising:

a coin handling machine configured to perform a coin deposit operation for counting loose coins so as to accept a count result as a deposit sum;

a banknote handling machine configured to perform a banknote deposit operation for counting banknotes so as to accept a count result as a deposit sum, and a banknote dispense operation for preparing change funds of banknotes;

a coin-roll handling machine configured to store a coin roll, and to perform a coin dispense operation for preparing change funds with the use of the stored coin roll;

a control unit configured to control the coin handling machine, the banknote handling machine, and the coin-roll handling machine; and a storage unit configured to store change information showing the number of the change funds for each denomination;

wherein the coin handling machine has:

a coin reception unit configured to receive the coins;

a coin recognition unit configured to recognize denominations of the coins and to count the number of the coins for each denomination;

a coin storing unit configured to store the coins; and a coin transport unit configured to transport the coins to the coin storing unit;

wherein the banknote handling machine has:

a banknote reception unit configured to receive the banknotes;

a banknote recognition unit configured to recognize denominations of the banknotes and to count the number of the banknotes for each denomination;

a banknote storing and feeding unit configured to store and feed the banknotes;

a banknote dispense unit configured to dispense the banknotes such that the banknotes can be taken out from outside; and a banknote transport unit configured to transport the banknotes to the banknote storing and feeding unit or the banknote dispense unit;

wherein the coin-roll handling machine has:

a coin-roll storing and feeding unit configured to store and feed the coin roll; and a coin-roll dispense unit configured to dispense the coin roll such that the coin roll can be taken out from outside; and wherein:

the control unit is configured to cause the coin handling machine to perform the coin deposit operation, and to cause the banknote handling machine to perform the banknote deposit operation, the control unit is configured to cause the banknote handling machine to perform the banknote dispense operation for transporting the banknotes received by the banknote reception unit to the banknote dispense unit based on the change information during the banknote deposit operation, and transporting banknotes corresponding to a shortage in change funds from the banknote storing and feeding unit to the banknote dispense unit; and the control unit is configured to cause the coin-roll handling machine to perform the coin-roll dispense operation for dispensing a coin roll from the coin-roll storing and feeding unit to the coin-roll dispense unit, based on the change information.

* * * * *